(12) United States Patent
Mayberry

(10) Patent No.: US 6,671,728 B1
(45) Date of Patent: Dec. 30, 2003

(54) ABSTRACT INITIATOR

(75) Inventor: Scott Mayberry, Brentwood, TN (US)

(73) Assignee: G.E. Information Services, Inc., Gaithersburg, MD (US)

( * ) Notice: Subject to any disclaimer, the term of this patent is extended or adjusted under 35 U.S.C. 154(b) by 0 days.

(21) Appl. No.: 09/506,367

(22) Filed: Feb. 18, 2000

(51) Int. Cl.[7] .............................................. G06F 15/16
(52) U.S. Cl. ........................ 709/227; 709/228; 709/230; 709/202
(58) Field of Search ................................ 709/227, 202, 709/206, 230, 228, 328

(56) References Cited

U.S. PATENT DOCUMENTS

| | | | |
|---|---|---|---|
| 5,210,824 A | * 5/1993 | Putz et al. | 715/523 |
| 5,485,617 A | * 1/1996 | Stutz et al. | 709/315 |
| 5,889,943 A | * 3/1999 | Ji et al. | 713/201 |
| 5,896,533 A | * 4/1999 | Ramos et al. | 709/217 |
| 5,987,517 A | * 11/1999 | Firth et al. | 709/230 |
| 6,314,468 B1 | * 11/2001 | Murphy et al. | 709/236 |
| 6,370,576 B1 | * 4/2002 | Huang | 709/224 |
| 6,377,993 B1 | * 4/2002 | Brandt et al. | 709/227 |
| 6,463,078 B1 | * 10/2002 | Engstrom et al. | 370/466 |

* cited by examiner

Primary Examiner—Mehmet B. Geckil
(74) Attorney, Agent, or Firm—Foley & Lardner

(57) ABSTRACT

A system using an electronic data interchange (EDI), which can also be referred to as a message broker or integration broker, handles the passage of data, such as files or electronic mail, between multiple computers. When transferring data from a computer internal to the network in which the message broker is located to a computer external to the network, a transfer protocol is used, such as FTP or SMTP. The message broker determines the transfer protocol to be used and invokes an initiator, which supports the determined transfer protocol, to make the data transfer according to the determined transfer protocol. The initiator can be implemented as a plug-in module to the message broker and may communicate with the message broker through a generic interface, which may be implemented as an application programming interface API.

16 Claims, 4 Drawing Sheets

ABSTRACT INITIATOR

FIELD OF THE INVENTION

The present invention relates generally to a system and method for transferring documents and files, and more particularly to a system and method for decoupling a transfer protocol from a central file transfer system.

BACKGROUND OF THE INVENTION

In a corporate environment, a network system enables users throughout the corporation to share files, such as business documents or mail messages. This sharing may be enabled through a system using, for example, an electronic data interchange (EDI). Such a system can also be referred to as a message broker or integration broker. The message broker may be implemented on a server in the network system of the corporate environment. To protect the network system from undesired external access, a firewall may be implemented as a gateway to and from the network system.

In addition to sharing files within the network system of the corporate environment, the message broker allows the files to be shared with entities external to the network system. This sharing is particularly useful in a business-to-business relationship. For example, it may be useful to share sales information or invoicing between a supplier business and a manufacturing business.

To share files with external entities, the message broker utilizes a transfer protocol. Known transfer protocols include, for example, the file transfer protocol (FTP), the simple mail transfer protocol (SMTP) and the hypertext transfer protocol (HTTP). As their names suggest, FTP is typically used for transferring files, and SMTP is typically used for transferring mail messages. HTTP is typically used for transferring data for web pages.

FIG. 1 is a block diagram of a conventional file transfer system 10. As shown in FIG. 1, the file transfer system 10 includes a network 20. Within the network 20 is a server 30, which is connected to a plurality of client terminals 50 and another server 45, to which is also connected a plurality of client terminals 50. A message broker 40 is implemented on the server 30.

A firewall 60 is coupled to the server 30 of the network 20. Trading partners 80, which correspond to entities external to the network 20, are coupled to the firewall 60. The message broker 40 can transfer data, such as a file using FTP, using a more direct connection for the trading partners 80 that are coupled directly to the firewall 60. Such a direct connection may be useful for high volume strategic trading partners. The firewall may also be coupled to a value added network (VAN) 70. The VAN 70 allows the message broker to transfer data to more remote trading partners 80.

Before establishing a connection with a trading partner 80, the message broker 40 is typically programmed to create a profile indicating the transfer protocol to be used with the trading partner 80. To establish the connection, the message broker 40, which includes routines integrated within the message broker 40 to transfer the data according to the various transfer protocols, refers to the profile to identify the appropriate transfer protocol. For example, if the message broker 40 is implemented in a network 20 for a supplier, the message broker 40 may be programmed to transfer files, such as invoices or purchase orders, to a trading partner 80 using FTP.

A problem with the conventional file transfer system 10 using a message broker 40 arises when the message broker 40 attempts to transfer data using a transfer protocol that the message broker 40 does not support. In other words, the message broker 40 does not include the integrated routine for transferring data with the transfer protocol identified in the profile. To overcome this problem, it is necessary create a new version of the message broker 40 by reprogramming the application underlying the message broker 40 to integrate the routines necessary for supporting the identified transfer protocol into the message broker 40.

SUMMARY OF THE INVENTION

In one aspect consistent with the present invention, a method for transferring data from a first computer in an internal network to a second computer outside of the internal network identifies a transfer protocol for transferring the data from the first computer and creates an instance of an initiator which supports the identified transfer protocol. A connection request is transferred to the instance of the initiator, which establishes a data connection from the first computer to the second computer in response to the connection request. The data is transferred across the data connection according to the identified transfer protocol.

In another aspect consistent with the present invention, a system for transferring data from a first computer in an internal network to a second computer outside of the internal network comprises a message broker, located in the internal network, which identifies a transfer protocol for transferring the data from the first computer to the second computer. The system further comprises one or more initiators, each initiator supporting a different transfer protocol, and an interface passing information between the message broker and the initiators. The message broker creates an instance of the initiator supporting the identified transfer protocol and transmits a connection request to the instance of the initiator via the interface. The instance of the initiator establishes a data connection from the first computer to the second computer in response to the connection request and transfers the data across the data connection according to the identified transfer protocol.

DETAILED DESCRIPTION OF THE PREFERRED EMBODIMENT

Figure 1:
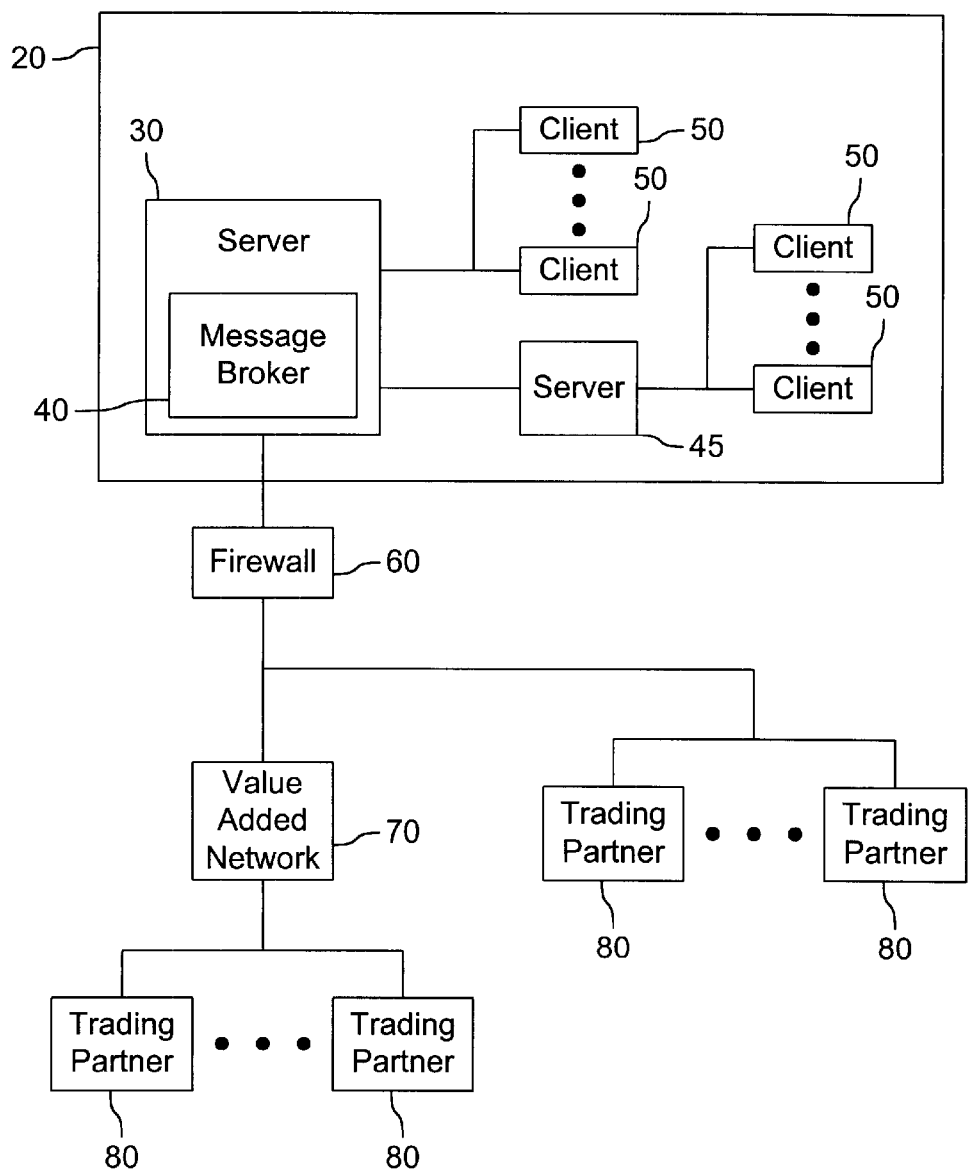
FIG. 1 is a block diagram of a conventional file transfer system.
Figure 2:
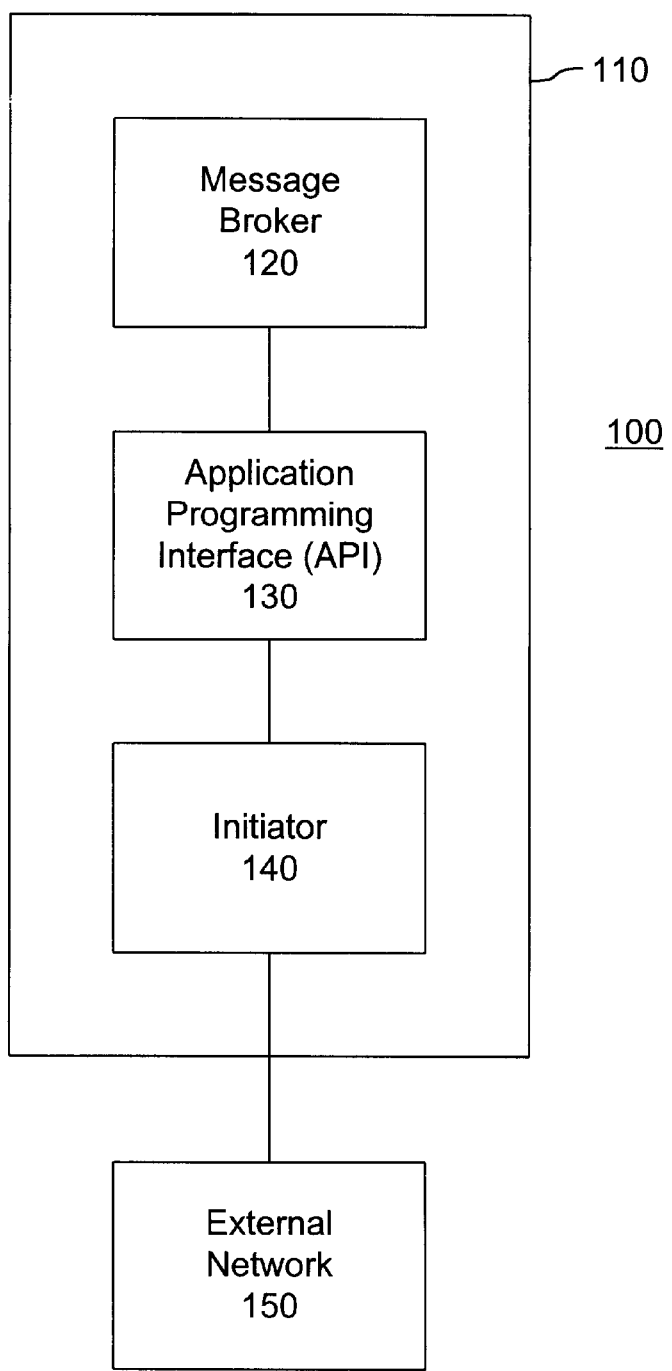
FIG. 2 is a block diagram of a message of a file transfer system consistent with the present invention.

FIG. 2 shows a block diagram of a file transfer system 100 consistent with the present invention. As shown in FIG. 2, the file transfer system 100 includes an internal network 110 and an external network 150. Internal network 110 includes a message broker 120, an application programming interface (API) 130 and an initiator 140. Although shown as a single element, initiator 140 can, in fact, be representative of multiple initiators.

The API 130 and the initiator 140 are used in conjunction with the message broker 120 to transfer data from the internal network 110 to the external network 150. Each transfer protocol that may be used to transfer data from the internal network 110 to the external network 150 is supported by a respective initiator 140. The initiator 140 is preferably programmed in an object-oriented language, such as Java or C++, although other programming languages are possible. The initiator 140 is preferably implemented as a plug-in application that communicates with the message broker 120 via the API 130.

The API 130 is preferably programmed in the same language as the initiator 140. The API 130 provides information from the message broker 120 to the initiator 140, which enables the initiator 140 to establish communication with the external network 150. The information provided to the initiator 140 via the API 130 includes any information that may be needed by a particular transfer protocol to establish a data connection with the external network 150. This information includes, for example, the IP address of the target location and the port number, as well as other values.

The information transferred from the message broker 120 via the API 130 may include information that is not needed by the particular transfer protocol supported by the initiator 140. Any information provided to the initiator 140 that is not needed to establish the data connection according to the particular transfer protocol is merely ignored. For example, information corresponding to the message type may not be needed for the FTP transfer protocol.

After establishing the connection, the initiator 140 passes data between the message broker 120 and the external network 150. The data from the initiator 140 to the external network 150 is passed according to the transfer protocol supported by the initiator 140. The data from the initiator 140 to the message broker. 120 is passed according to a generic protocol supported by the API 130, which is discussed below in more detail.

By using a generic protocol to provide communication between the initiator 140 and the message broker 120, each initiator 140 can be programmed to support a particular transfer protocol and communicate with the message broker according to the generic protocol supported by the API 130. In addition, the message broker 120 does not need to know the particularities of the transfer protocol supported by the initiator 140. Rather, the message broker 120 only needs to be programmed to communicate with the initiator 140 using the generic protocol provided by the API 130. The message broker 120 can provide the same information to each initiator 140, regardless of the transfer protocol supported by that initiator. Accordingly, the communication between the initiator 140 and the external network 140 is protocol dependent, whereas the communication between the initiator 140 and the message broker 120 is protocol independent.

The data passed between the message broker 120 and the initiator 140 via the API 130 may be passed as arguments in specific method calls defined by the API 130. These method calls include, for example, connect, deliver message and message delivery status. The specific method or function call for the generic exchange may have language specific arguments. For example, a deliver message method call implemented in C++ might use a char array, which is a primitive data type, for communicating the data content and attributes of the message to be delivered. If the deliver message method call is implemented in Java, however, the same piece of information passed in a char array may be passed as a string.

Features of object oriented programming languages, such as Java and C++, are useful for implementing the message broker 120, the API 130 and the initiator 140. The decision by the message broker 120 at runtime to create an instance of an initiator 140 of a specific type based upon the transfer protocol associated with a particular destination, followed by the use of that initiator 140 via a generic set of calls without regard to the kind of initiator 140, is served well by the inheritance and polymorphism features of object oriented languages. Each kind of initiator 140 can be implemented as a subclass, which inherits from a common superclass after the creation of an initiator object. The method calls defined by the superclass are actually performed by implementations of those methods by the particular subclass.

Non-object oriented programming languages may also be used. Many non-object oriented programming languages provide capabilities for achieving the same effect in an indirect manner. For example, in the C language, an abstract API 130 can be defined as a set of function calls but invoked indirectly through function pointers to runtime-selected implementations of those functions. Therefore, a message broker 120 using C could select a particular type of initiator 140 and logically create an instance of that initiator 140 by initializing a set of function pointers. The message broker 120 could then call those functions and remain fully independent of the transfer protocol handled by the C functions that embody the initiator 140.

Figure 3:
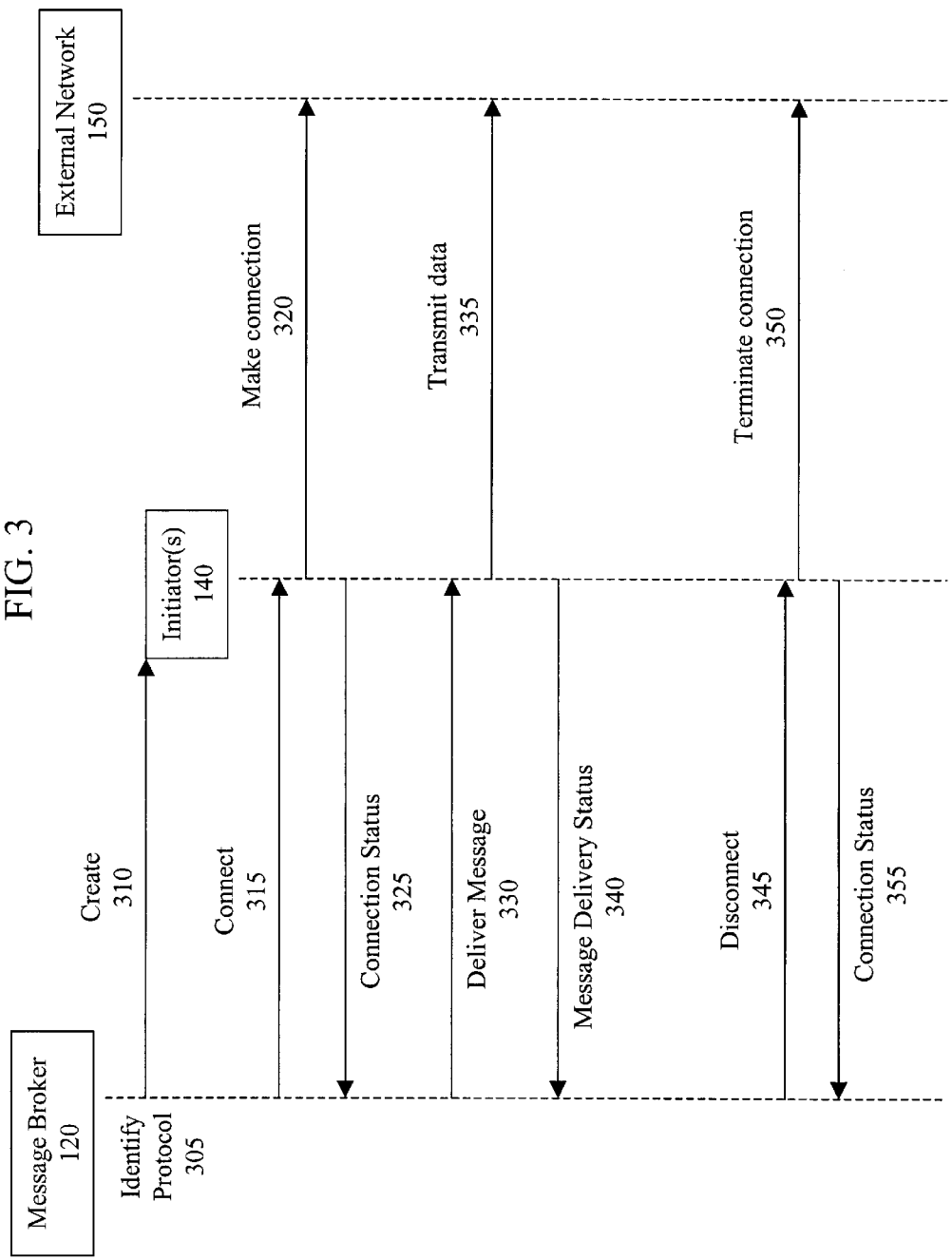
FIG. 3 is a flow diagram of a file transfer process consistent with the present invention.

FIG. 3 is a flow diagram of a data transfer process consistent with the present invention. The process shown in FIG. 3 should be understood as being applicable to any transfer protocol. As shown in FIG. 3, first the message broker 120 determines the transfer protocol with which the data is to be transferred (step 305). The data may be, for example, an electronic mail message, a document, or a file. The transfer protocol may be determined by referring to a profile stored in the message broker 120, which indicates the transfer protocol to be used with the particular external network 150. Once the transfer protocol is determined, the message broker 120 identifies the initiator 140 which supports the determined transfer protocol and creates an instance of that initiator 140 (step 310). If the initiator 140 is written in an object oriented language, such as Java or C++, the instance of the initiator 140 is called an initiator object. If there is data going to different destinations, then multiple instances of the initiator 140 would be created, one for each destination. For purposes of the following explanation, it will be assumed that step 310 creates an initiator object 140, although the present invention is not limited to the use of objects.

After the initiator object 140 is created, the message broker 120 invokes a connect call via the API 130 (step 315). The connect call can also be referred to as an API method or API function. The invocation of the initiator object 140 allows the initiator object 140 to make the data connection according to the transfer protocol supported by the initiator 140. To make the data connection, the connect call function includes the information needed by the initiator object 140 to establish the data connection. This information may be passed as generic arguments with the connect call function, such as with a generic data structure. Alternatively, this information may be gathered from the runtime environment. The information provided is preferably identical for each connect call function, regardless of the transfer protocol. As a result, the message broker 120 does not require a different connect call function for each type of transfer protocol. In other words, the message broker 120 can treat each transfer protocol in the same way.

The initiator object 140 then makes the data connection with the external network 150 (step 320). To make the connection, the initiator object 140 uses the generic arguments passed from the message broker 120. The particular arguments used may vary according to the transfer protocol. In general, most transfer protocols may require the IP address of the external network 150 and the port number. The initiator object 140 also determines if the connection was made successfully.

Based upon the connection made, the initiator object 140 passes a connection status message to the message broker 120 via the API 130 (step 325). The information passed to the message broker 120 with the connection status message includes, for example, if the initiator object 140 is ready to pass a message, if the connection has been disconnected, or if the connection is ready to be disconnected. This information passed to the message broker 120 is protocol independent. If the initiator object 140 is unable to establish the data connection, the initiator object 140 passes error information in the connection status message in step 325. The error information may be protocol dependent and may be stored in an error log or transferred to an error notification system in message broker 120 or elsewhere in the internal network 110.

Assuming the connection has been made to the external network 150 and there is a message to be transferred, the message broker 120 transmits a deliver message method (step 330). The deliver message method includes message attributes and a message body. The message attributes includes, for example, the address of the sender and receiver, the message type, and the time and date of creation of the message. As discussed above, the attributes sent are not dependent upon the type of transfer protocol being used. The attributes sent preferably include each attribute that may be needed by any transfer protocol. If the attribute is not needed for the transfer protocol, the attribute is ignored. For example, the SMTP protocol uses a subject field, but the FTP protocol does not. The message body corresponds to the data content being transferred.

After receiving the deliver message method, the initiator object 140 transmits the message to the external system 150 (step 335). The initiator object 140 uses the message attributes needed by the transfer protocol to transfer the message body, as well as message attributes, if relevant or necessary. The initiator object 140 recognizes whether the message body has been transferred.

The initiator object 140 then transmits a message delivery status to the message broker 120 via the API 130 (step 340). The message delivery status has a variety of information including, for example, whether the message transfer was successful, whether there has been an acknowledgment, the transfer commit status, and an indication of the connection status. As discussed above, the initiator object 140 recognizes whether the message has been transferred successfully. The content of the acknowledgment in the message delivery status may be, for example, that the data has been received, that it is expected, or that it is not expected. Since only some transfer protocols and some external networks provide acknowledgments, the content of the acknowledgment may be dependent upon the transfer protocol or external network. If the initiator object 140 expects to receive an acknowledgment not yet received, the initiator object 140 may update the message deliver status when the acknowledgment is received.

The commit status advises the message broker 120 whether the transfer of the message should be considered as final. If the commit status is "yes," the message broker 120 can depend upon the transfer indication provided by the initiator object 140. If the commit status is "no," the message broker 120 cannot take as final the status provided by the initiator object 140. The inclusion of the connection status in the message delivery status informs the message broker 120 whether the initiator object 140 can do further message deliveries.

After delivering the message, the message broker 120 can send a disconnect request to the initiator object 140 via the API 130 (step 345). In response to the disconnect request, the initiator object 140 terminates the data connection to the external network 150 (step 350). The initiator object 140 then sends a connection status to the message broker 120 via the API 130 indicating that the data connection has been disconnected (step 355). This connection status message in step 355 may also include a commit status indicating that the message broker should consider as final that the message has been successfully or unsuccessfully transmitted.

Figure 4:
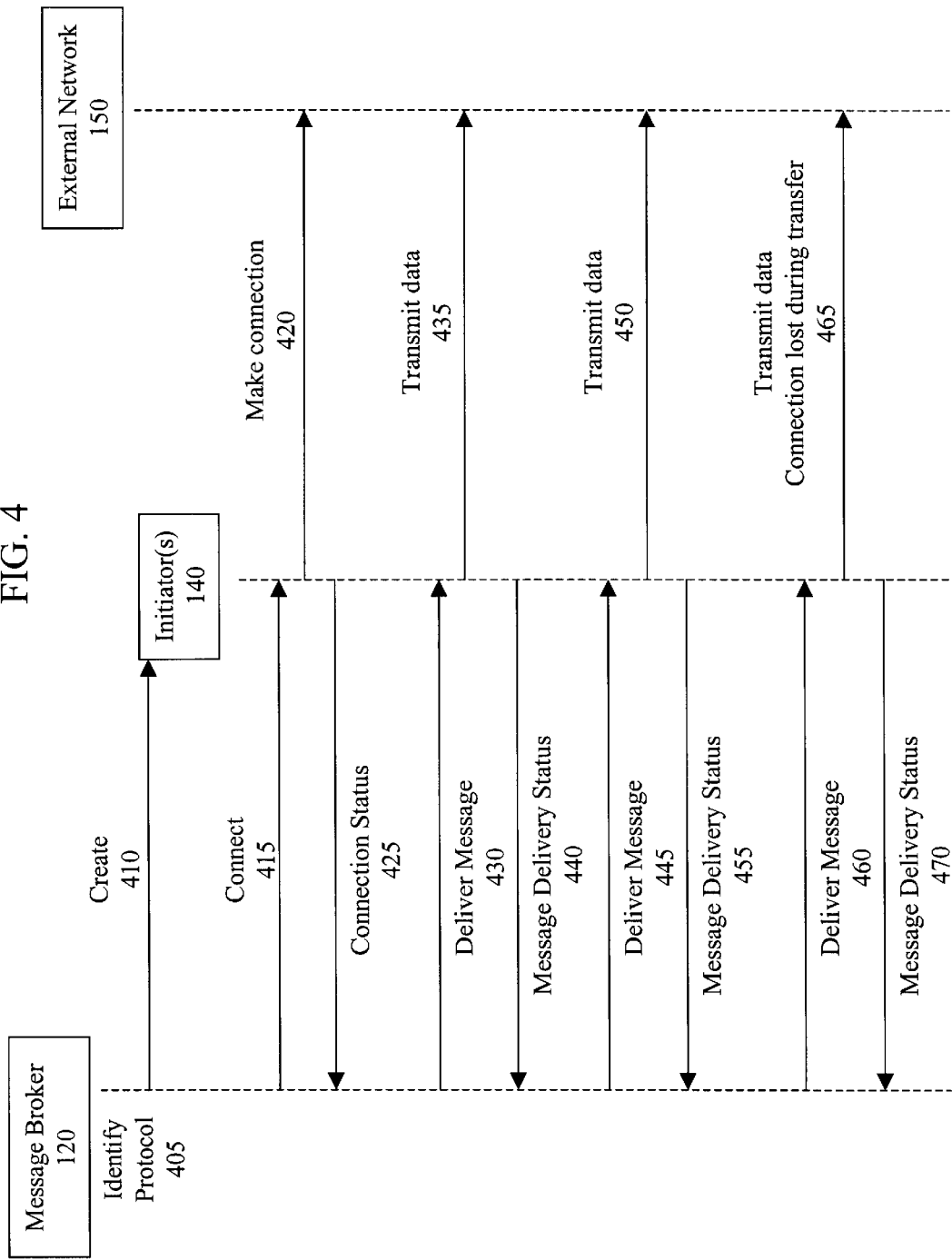
FIG. 4 is a flow diagram of another file transfer process consistent with the present invention.

FIG. 4 is a flow diagram of another data transfer process consistent with the present invention. More particularly, the flow diagram of FIG. 4 shows a process similar to that of FIG. 3, except that multiple messages are delivered using the identified transfer protocol and the data connection is interrupted before all the messages are completed. As shown in FIG. 4, steps 405 through 440 correspond to steps 305 through 340. Instead of sending a disconnect message after completion of the transfer of the first message, another deliver message method is transmitted from the message broker 120 to the initiator object 140 via the API 130 (step 445). The initiator object 140 then transmits the message body to the external network 150 (step 450) and sends the message delivery status to the message broker 120 via the API 130 (step 455).

The message broker 120 sends another deliver message method to the initiator object 140 via the API 130 (step 460), which the initiator object 140 attempts to transmit to the external network 150 (step 465). During the transmission, however, the data connection is lost. The initiator object 140 then sends the message delivery status (step 470). Since the connection is lost during the transfer, the message delivery status passed to the message broker 120 via the API 130 includes an indication that the message deliver was unsuccessful.

The following is an example of a definition of the API 130 implemented in Java code. This definition serves as a parent class, also referred to as a superclass, for each type of initiator 140 that may be developed. package initiator; import java.util.Properties; /** * This abstract initiator class defines the API that all initiators * support. While various subclasses of initiator may vary greatly * due to the different protocols they implement, the message broker * drives them all using this uniform interface. * */

--- public abstract class Initiator{
    /**
     * The following is a connect to an external system for a message delivery session.
     * Any connection properties (e.g., host, port) are conveyed in the

```
 * connectionProperties argument. The nature of the connection may
 * vary greatly, depending upon the specific transfer protocol associated
 * with the subclass of the instance of the initiator. The return value is
 * a connectionStatus int as defined in MessageDeliveryStatus.
 *
 */
public abstract int Connect(Properties connectionProperties);
/**
 * The following is an attempt to deliver a message. A message broker uses this method
 * to hand a message (conveyed by a MessageAttribute and MessageBody object)
 * to the initiator for transmission via the particular transfer protocol
 * it provides. A MessageDeliveryStatus object is returned
 * expressing the results of the transfer.
 *
 */
public abstract MessageDeliveryStatus DeliverMessage(MessageAttributes attr,
MessageBody body);
/**
 * The following instructs the initiator to disconnect from the external system.
 * This could be due to message broker policy (e.g., there are no messages
 * ready for delivery to the system to which the Initiator is connected)
 * or in reaction to the initiator returning a connectionStatus of
 * READY_FOR_DISCONNECT. Therefore, the decision to disconnect may be
 * made by either the message broker or the initiator.
 *
 */
public abstract int Disconnect();
}
```

The following is an example of code for defining the structure and content of the message delivery status returned by a deliver message method. This code is representative of a supporting class. package initiator; * The following defines the information returned by an initiator * to the message broker expressing the result of a * MessageDelivery attempt. * */

```
public class MessageDeliveryStatus {
    /**
     * True if the message was successfully transmitted
     * by the initiator, false otherwise. The precise
     * nature of the transmission varies by initiator.
     *
     */
    public boolean transferSuccess;
    /**
     * The following expresses whether an acknowledgment to the message
     * transfer is EXPECTED in a later interaction, already
     * RECEIVED as part of the transfer sequence, or
     * NOT_EXPECTED.
     *
     */
    public int acknowledgmentExpected;
    public final static int RECEIVED = 1;
    public final static int EXPECTED = 2;
    public final static int NOT_EXPECTED = 3;
    /**
     * True indicates that the message broker should consider
     * this MessageDeliveryStatus to be final and ready to be
     * committed to its databases. Otherwise, the status
     * conveyed in this MessageDeliveryStatus should be
     * treated as provisional and subject to being rolled
     * back.
     *
     * A MessageDeliveryStatus with commit set to true
     * indicates to the message broker that not only the
     * current message transfer result is final, but also
     * any subsequent transfers in the same session that
     * remain uncommitted. When the session is terminated,
     * regardless of the reason, any uncommitted delivery
     * results should be considered by the message broker
     * to be invalid and therefore rolled back.
     *
     */
    public boolean commit;
    /**
```

-continued

```
 * The following expresses the state of the connection to the external
 * system as understood by the initiator. READY_FOR_MESSAGE
 * means that the connection is established and the initiator
 * is ready to attempt delivery of a message. READY_FOR_DISCONNECT
 * means that the connection is established, but that no further message
 * deliveries should be attempted in this session. DISCONNECTED means
 * that the message broker should consider that the connection
 * was lost and no further message deliveries should be attempted
 * by this initiator instance.
 *
 */
public int connectionStatus;
final public static int READY_FOR_MESSAGE = 1;
final public static int READY_FOR_DISCONNECT = 2;
final public static int DISCONNECTED =3;
}
```

The following is an example of an actual initiator 140. This example simply writes lines to an audit file. However, it also illustrates with its structure and comments how a developer may build an initiator 140 and fill in details within each of the methods specific to the protocol supported by the initiator 140 package initiator; import java.util.Properties; * This example of an initiator illustrates a specific * transfer protocol implemented as an initiator subclass. * In this example, the actual "transfer" entails merely writing * a summary line to a standard output stream. * */

```
public class SimpleInitiator extends Initiator {
    /**
     * Since there is no real connecting to do in this case, the return simply
     * indicates that the connection was established and that
     * message deliveries may begin.
     *
     */
    public int Connect(Properties connectionProperties)
    {
    return MessageDeliveryStatus.READY_FOR_MESSAGE;
    }
    /**
     * The following transfers the message by simply writing a summary line.
     * The return to the message broker indicates that the delivery
     * was successful and that additional messages may be delivered
     * over the same "connection".
     *
     */
    public MessageDeliveryStatus DeliverMessage(MessageAttributes attr,
    MessageBody body)
    {
    System.out.println("Message delivered");
    // At this point in a typical initiator, the MessageAttributes
    // and MessageBody arguments are used to gain access to the
    // message to be transferred.
    MessageDeliveryStatus status = new MessageDeliveryStatus();
    status.transferSuccess = true;
    status.acknowledgmentExpected = MessageDeliveryStatus.NOT_EXPECTED;
    status.commit = true;
    status.connectionStatus = MessageDeliveryStatus.READY_FOR_MESSAGE;
    return status;
    }
    /**
     * Although there is no real connection to disconnect, the return
     * is as if the session was disconnected.
     *
     */
    public int Disconnect()
    {
    return MessageDeliveryStatus.DISCONNECTED;
    }
}
```

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for transferring data from a first computer in an internal network to a second computer outside of the internal network, comprising:
   identifying a transfer protocol for transferring the data from the first computer;
   creating an instance of an initiator which supports the identified transfer protocol;
   transferring a connection request to the instance of the initiator;
   establishing a data connection from the first computer to the second computer in response to the connection request;
   transferring the data across the data connection according to the identified transfer protocol;
   transferring a disconnect request to the instance of the initiator; and
   terminating the data connection from the first computer to the second computer in response to the disconnect request.

2. A method according to claim 1, wherein the step of transferring a connection request includes the substep of transferring the connection request according to a generic protocol.

3. A method according to claim 1, wherein the data transferred across the data connection established in response to the connection request includes a plurality of messages transferred from the first computer to the second computer.

4. A system for transferring data from a first computer in an internal network to a second computer outside of the internal network, comprising:
   a message broker, located in the internal network, configured to identify a transfer protocol for transferring the data from the first computer to the second computer;
   one or more initiators, each initiator supporting a different transfer protocol;
   an interface passing information between the message broker and the initiators;
   wherein the message broker creates an instance of the initiator supporting the identified transfer protocol and transmits a connection request to the instance of the initiator via the interface,
   wherein the instance of the initiator establishes a data connection from the first computer to the second computer in response to the connection request and transfers the data across the data connection according to the identified transfer protocol, and
   wherein the message broker transfers a disconnect request to the instance of the initiator, and the instance of the initiator terminates the data connection from the first computer to the second computer in response to the disconnect request.

5. A system according to claim 4, wherein the data transferred across the data connection established by the instance of the initiator in response to the connection request includes a plurality of messages transferred from the first computer to the second computer.

6. A system according to claim 4, wherein the information is passed between the message broker and the initiators according to a generic protocol supported by the interface.

7. A system according to claim 4, wherein the initiators and the interface are implemented in the same programming language.

8. A system according to claim 7, wherein the initiators and the interface are implemented in an object-oriented programming language.

9. A computer readable storage device having a utility for transferring data from a first computer in an internal network to a second computer outside of the internal network, the utility comprising:
   a message broker configured to identify a transfer protocol for transferring the data from the first computer to the second computer;
   one or more initiators, each initiator supporting a different transfer protocol;
   an interface passing information between the message broker and the initiators;
   wherein the message broker creates an instance of the initiator supporting the identified transfer protocol and transmits a connection request to the instance of the initiator via the interface,
   wherein the instance of the initiator establishes a data connection from the first computer to the second computer in response to the connection request and transfers the data across the data connection according to the identified transfer protocol; and
   wherein the message broker transfers a disconnect request to the instance of the initiator, and the instance of the initiator terminates the data connection from the first computer to the second computer in response to the disconnect request.

10. A utility according to claim 9, wherein the data transferred across the data connection established by the instance of the initiator in response to the connection request includes a plurality of messages transferred from the first computer to the second computer.

11. A utility according to claim 9, wherein the information is passed between the message broker and the initiators according to a generic protocol supported by the interface.

12. A utility according to claim 7, wherein the initiators and the interface are implemented in the same programming language.

13. A utility according to claim 9, wherein the initiators and the interface are implemented in an object-oriented programming language.

14. A computer system. comprising a device for transferring data from a first computer in an internal network to a second computer outside of the internal network, the device configured to:
   identify a transfer protocol for transferring the data from the first computer;
   create an instance of an initiator which supports the identified transfer protocol;
   transfer a connection request to the instance of the initiator;
   establish a data connection from the first computer to the second computer in response to the connection request;
   transfer the data across the data connection according to the identified transfer protocol;
   transfer a disconnect request to the instance of the initiator; and
   terminate the data connection from the first computer to the second computer in response to the disconnect request.

15. A computer system according to claim 11, wherein the device is further configured to transfer the connection request according to a generic protocol.

16. A computer system according to claim 14, wherein the device is further configured to transfer a plurality of messages from the first computer to the second computer across the data connection established in response to the connection request.

* * * * *